(12) United States Patent
Park et al.

(10) Patent No.: US 7,202,376 B2
(45) Date of Patent: Apr. 10, 2007

(54) METHOD OF PRODUCING POLYCARBOSILANE USING ZEOLITE AS CATALYST

(75) Inventors: Hong Sik Park, Gyeongsangnam-do (KR); Dong Won Lim, Gyeongsangnam-do (KR); Kwang Soo Kim, Gyeongsangnam-do (KR); Young Hee Kim, Seoul (KR); Doh Hyung Riu, Seoul (KR); Hyung Rae Kim, Gyeonggi-do (KR); Dong Geun Shin, Gyeonggi-do (KR); Soo Ryong Kim, Seoul (KR); Kyung Ja Kim, Gyeonggi-do (KR); Hyun Kyu Shin, Gyeongsangnam-do (KR); Dae Hyun Cho, Gyeongsangnam-do (KR)

(73) Assignees: DACC Co., Ltd., Kyungnam (KR); Korea Institute of Ceramic Engineering & Technology, Seoul (KR)

( * ) Notice: Subject to any disclaimer, the term of this patent is extended or adjusted under 35 U.S.C. 154(b) by 355 days.

(21) Appl. No.: 10/851,693

(22) Filed: May 21, 2004

(65) Prior Publication Data
US 2005/0014964 A1    Jan. 20, 2005

(30) Foreign Application Priority Data
May 22, 2003    (KR) .................... 10-2003-0032502

(51) Int. Cl.
*C07F 7/04* (2006.01)

(52) U.S. Cl. .................................... 556/467

(58) Field of Classification Search ................ 556/467
See application file for complete search history.

(56) References Cited

U.S. PATENT DOCUMENTS 4,052,430 A    10/1977    Yajima et al. ............ 260/448.2
4,590,253 A    5/1986    Hasegawa et al. ............ 528/14

FOREIGN PATENT DOCUMENTS

JP    62-079228    4/1987

OTHER PUBLICATIONS

Chemical Abstract 2004:28979; Abstract of Characterization of SiC fiber derived from polycarbosilane, Riu, Doh Hyung; Kim, Young Hee; Shin, Dong Geun; Kim, Hyung Rae; Ceramic Transactions (2003), 154(Innovative Processing and Synthesis of Ceramics, Glasses, and Composites VII), 77-86, Sep. 2003.*

\* cited by examiner

*Primary Examiner*—Samuel Barts
(74) *Attorney, Agent, or Firm*—Fish & Richardson P.C.

(57) ABSTRACT

The present invention is related to a method of producing polycarbosilane by heating polydimethylsilane at low pressure within the range of 320~450° C. using zeolite having the Si/Al or Si/B ratio of 1~200 as catalyst. This invention uses a zeolite with the structure of ZSM-5, ZSM-11, ZSM-12, zeolite X and zeolite Y, which has the Si/Al or Si/B ratio of 1~200, as catalyst. When polycarbosilane is produced using a specific zeolite as catalyst, Si/Al or Si/B ratio can be adjusted at any proportion, enabling acidity control of catalyst, and therefore the molecular weight of final products can be easily controlled and the product yield can be improved, compared to conventional solid acid catalysts.

11 Claims, 1 Drawing Sheet

METHOD OF PRODUCING POLYCARBOSILANE USING ZEOLITE AS CATALYST

FIELD OF INVENTION

The present invention relates to a method of producing polycarbosilane by converting polydimethylsilane into polycarbosilane using zeolite as catalyst, more particularly, to a method of producing polycarbosilane by converting polydimethylsilane into polycarbosilane by means of the Kumada conversion reaction using zeolite having the Si/Al or Si/B ratio of 1~200 as catalyst at low pressure within the range of 320~450° C.

BACKGROUND OF THE INVENTION

Polycarbosilane is widely used as a precursor for producing SiC-based continuous fiber primarily or as a precursor of SiC coating, SiC powder, and SiC composite materials for improving their acid and heat resistance.

As a method of producing the polycarbosilane that is widely used for producing SiC-based fiber or as SiC coating precursor, the Yajima (refer to U.S. Pat. No. 4,052,430) method by means of high-temperature pressurized reaction above 400° C., which uses polydimethylsilane as a starting material, is primarily used at present. According to this method, however, pyrolytic by-products such as $Me_2SiH_2$, $Me_3SiH$ etc. are created during the reaction as it is pressurized by a pressure cooker, thereby rising internal pressure of the pressure cooker above 100 atm during the reaction; in particular, due to ignition property of these silane-based gases in the existence of oxygen at low temperature, there exists a problem in stability due to a danger of ignition when these gases are leaked by the pressurization during the reaction.

In order to solve this problem, polycarbosilane was composed using polyborodiphenylsiloxane as catalyst at atmospheric pressure by Yajima (refer to Nature Vol. 273 No. 15, 525–527), thereafter, it was reported by Kurosaki Refractories Co. Ltd. that polycarbosilane was composed using solid acids such as $AlCl_3$, $ZrCl_2$, $VCl_3$, $SbCl_3$ as catalyst (refer to U.S. Pat. No. 4,590,253, Japanese Patent JP 87-79228) within the range of 320° C.~370° C. However, it is difficult to control acidity of the catalyst since these solid catalysts showed strongly acid, and the yield of final products was low and also it is difficult to control molecular weight of these products.

SUMMARY OF THE INVENTION

Inventors of the present invention have closely investigated the above described problems and eventually discover that the yield of final products is high and also it is easy to control molecular weight when polycarbosilane is produced using a specific zeolite as catalyst, compared to conventional solid acid catalyst or polyborodiphenylsiloxane catalyst.

The object of the invention is to provide a method of producing polycarbosilane at high yield with easily controllable molecular weight from polydimethylsilane using a specific zeolite as catalyst.

In order to achieve the above described object, the method of producing polycarbosilane according to the present invention includes the steps of producing zeolite catalyst, producing polydimethylsilane, mixing the zeolite catalyst with the polydimethylsilane, reacting the mixture of the zeolite catalyst and the polydimethylsilane at a predetermined temperature for a predetermined time, and purifying the obtained reaction product, followed after the reaction step to obtain polycarbosilane.

Furthermore, it is preferable that the purifying step includes the steps of removing solid product by dissolving and filtering the reaction product in hexane, removing hexane from the reaction product in which the solid product has been removed, and removing oligomer from the reaction product in which the hexane has been removed.

Furthermore, it is preferable that the zeolite catalyst is any one of ZSM-5, ZSM-11, ZSM-12, zeolite X and zeolite Y.

Furthermore, it is preferable that 0.1~10 weight % of the zeolite catalyst is used for 100 weight % of the polydimethylsilane.

Furthermore, it is preferable that the reaction temperature is 250~450° C.

Furthermore, it is preferable that the reaction time is 3~20 hours.

DETAILED DESCRIPTION OF THE INVENTION

Figure 1:
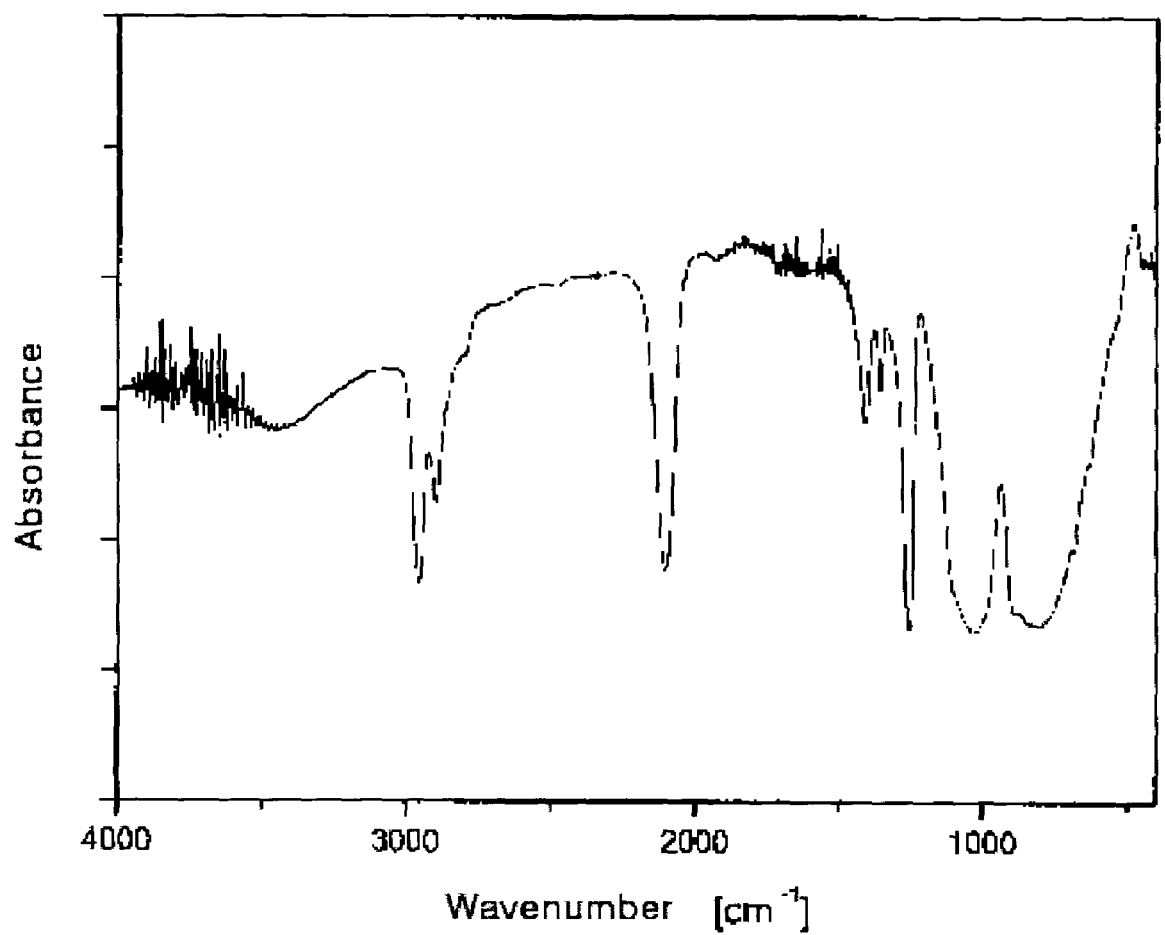
FIG. 1 is a FT-IR chart of polycarbosilane obtained by using zeolite catalyst.

Hereinafter, the present invention will be described in detail.

The zeolite that is used in this invention has a three-dimensional structure combining oxygen atom to an apex of regular tetrahedron in the center of silicon or aluminum atom, for example, it is represented by a general formula of $Na_m(AlO_2)_m(SiO_2)\cdot xH_2O$. This is not an acid, but it becomes a Bronsted acid type catalyst when it is calcined by exchanging Na with ammonium ion. Since the acidity of zeolite catalyst is controllable by adjusting Si/Al or Si/B ratio, it is supposed that the molecular weight of final product can be easily controlled and also the product yield can be improved, compared to conventional solid acid catalyst.

The zeolite that can be used for this invention includes a zeolite having the structure of ZSM-5, ZSM-11, ZSM-12, zeolite X and zeolite Y having the Si/Al or Si/B ratio of 1~200, but it is not restricted to this structure only. Polydimethylsilane, which is used as a starting material in the method of producing polycarbosilane according to the invention, can be produced by condensing and reacting dimethyldichlorosilane with alkali metal, preferably with sodium metal, under inert atmosphere such as nitrogen. Specifically, it can be produced by adding sodium metal, which is sliced into small pieces, to solvent such as tetrahydrofurane and then dispersing the sodium metal completely by heating and agitation, injecting dimethyldichlorosilane into this solution and then heating to form a polymer, and then removing residual sodium metal and solvent.

According to the production method of the present invention, reaction should be implemented under inert atmosphere. As for inert gases, there are nitrogen, argon, helium, carbon monoxide, carbon dioxide, etc.

Moreover, it is preferable that this invention is implemented under atmospheric pressure. When it is implemented under vacuum environment, product yield can be declined since small molecular weight component may be removed from the reaction system through distillation; on the other hand, when it is implemented under high pressure, it has a problem in stability since a great quantity of by-products may be created, thereby increasing pressure.

According to the present invention, furthermore, reaction temperature is typically within the range of 250~450° C., preferably 300~400° C. When reaction temperature is less than 250° C., conversion into polycarbosilane will not be sufficient; on the other hand, when it is over 450° C., high pressure due to abrupt pyrolytic reaction of PDMS (polydimethylsiloxane) should be concerned about.

According to the present invention, furthermore, reaction time is typically 3~20 hours, preferably 5~15 hours. When reaction time is less than 3 hours, conversion into polycarbosilane will not be sufficient; on the other hand, when it is over 20 hours, more improvement in yield cannot be expected.

According to the present invention, furthermore, 0.1~10 weight % of zeolite is used for 100 weight % of polydimethylsilane. When it is less than 0.1 weight %, yield will be declined since polydimethylsilane ratio, which have not been converted, is high; on the other hand, even when it is used over 10 weight %, more improvement in yield cannot be expected.

PREFERRED EMBODIMENTS

Though preferred embodiments will be described below for a better understanding of the present invention, these preferred embodiments comes under an example of the invention only; therefore, the present invention will not be restricted by these preferred embodiments.

Hereinafter, the method of producing polycarbosilane from polydimethylsilane at low pressure using a zeolite of the invention as catalyst will be described. First, zeolite catalyst used in this invention was produced as described below.

Manufacture of Catalyst

<Manufacture of ZSM-5 zeolite catalyst -1>

1.37 g of sodium hydrate (97%) and 5.43 g of tetraprophylammonium bromide (98%) were added to Teflon reaction container, and 126 g of water was added to this solution and stirred for an hour to dissolve. Subsequently, 12 g of fumed silica was added to this solution and stirred for 12 hours, and then the Teflon reaction container was added to a stainless container and heated at 150° C. for 5 days to obtain ZSM-5 zeolite catalyst having Si/Al ratio 30 containing impurities. The catalyst was cleaned several times with distilled water and then dried inside an oven at 100° C., and then calcined at 550° C. for 12 hours to remove amine, which was contained in the catalyst, and also had a reflux using aqueous solution having 0.1M of ammonium nitrate per 1 g of the catalyst to remove Na ion, which was contained in the catalyst. After this process, the catalyst was cleaned several times with distilled water and dried inside an oven, and then calcined more for 4 hours in the air at 500° C. to obtain pure ZSM-5 zeolite catalyst having Si/Al ratio 30.

<Manufacture of ZSM-5 zeolite catalyst -2>

1.37 g of sodium hydrate (97%), 5.43 g of tetraprophylammonium bromide (98%) and 0.420 g of $H_3BO_4$ were added to Teflon reaction container, and 126 g of water was added to this solution and stirred for an hour to dissolve. Subsequently, 12 g of fumed silica was added and stirred for 12 hours, and then the Teflon reaction container was added to a stainless container and heated at 150° C. for 5 days to obtain ZSM-5 zeolite catalyst having Si/B ratio 30 containing impurities. The zeolite catalyst containing boron was cleaned several times with distilled water and then dried inside an oven at 100° C., and then had a reflux using aqueous solution having 0.1M of ammonium nitrate per 1 g of the catalyst to remove Na ion, which was contained in the catalyst. After this process, the catalyst was cleaned several times with distilled water and dried inside an oven, and then calcined more for 4 hours in the air at 500° C. to obtain pure ZSM-5 zeolite catalyst having Si/B ratio 30.

<Manufacture of zeolite Y>

4.07 g of sodium hydrate (97%) and 2.09 g of sodium aluminate were completely dissolved in 19.95 g of distilled water, and then 22.72 g of sodium silicate was added to this solution and ripened at room temperature for a day to obtain seed gel. Separately from this process, 0.14 g of sodium hydrate (97%) and 13.9 g of sodium aluminate were completely dissolved in 130.97 g of distilled water, and then 142.43 g of sodium silicate was added to this solution and ripened at room temperature for a day to obtain feed stock gel. 16.50 of the seed gel was added to the feed stock gel and stirred sufficiently and then heated at 100° C. for four days to obtain zeolite Y having Si/Al ratio 2.37 containing impurities. The obtained catalyst was cleaned several times with distilled water and then dried inside an oven at 100° C., and then had a reflux using aqueous solution having 0.1M of ammonium nitrate per 1 g of the catalyst to remove Na ion, which was contained in the catalyst. After this process, the catalyst was cleaned several times with distilled water and dried inside an oven, and then calcined more for 4 hours in the air at 500° C. to obtain pure zeolite Y having Si/Al ratio 2.37.

Manufacture of polydimethylsilane

Polydimethylsilane used in this invention was produced as described below.

Xylene was added to 4-neck round flask and then 40.4 g of sodium metal sliced sufficiently into small pieces was added under nitrogen atmosphere and dispersed with the solvent by heating and agitation. 100 ml of dimethylchlorosilane was injected at the rate of 100 ml/hour into this solution, and reacted at 140° C. for 7 hours to obtain purplish sediment. This reaction material was cooled down to room temperature, and residual sodium metal was dissolved by adding methanol, and then filtered for separating sediment. This sediment was cleaned with distilled water and acetone and then dried under vacuum environment to obtain white-colored polydimethylsilane.

Manufacture of polycarbosilane

<First Embodiment>

20 g of the obtained polydimethylsilane and 0.3 g of ZSM-5 zeolite catalyst having Si/Al ratio 30 was added to a stainless steel container attached with reflux device, and agitated under nitrogen atmosphere, and then heated up to 350° C. at the rate of 5° C./minute, and then reacted for 10 hours to obtain yellowish solid having high viscosity. Subsequently, the reaction product was cooled down to room temperature and then dissolved in hexane and filtered to remove solid-state material (hexane insoluble material). After this process, the filtered solution was distilled under vacuum environment to remove hexane, and distilled again under vacuum environment at 280° C. to remove small molecular oligomer, and finally 12.4 g of polycarbosilane was obtained. For this polycarbosilane, FT-IR was measured as shown in FIG. 1, and as a result it was confirmed pure polycarbosilane with no impurities. In the IR spectra of FIG. 1, the peak at 1020 $cm^{-1}$ represented Si—$CH_2$—Si confirming that it was polycarbosilane, and a very broad band around 828 $cm^{-1}$ represented Si—$CH_3$ bending and Si—C stretching of $SiC_4$, and the peak by means of Si—$CH_3$ was shown at 1235 $cm^{-1}$.

The H stretching in $CH_2$ or $CH_3$ was shown at 1350 $cm^{-1}$ and 1390 $cm^{-1}$, and the relatively sharp peak at 2095 $cm^{-1}$ represented Si—H. Two peaks before and after 2900 $cm^{-1}$ were created by C—H.

The yield measured by weight ratio of input polydimethylsilane and output polycarbosilane was 62.0%, and average molecular weight measured by gel permeation chromatography was 2150.

<Second Embodiment>

20 g of the obtained polydimethylsilane and 0.3 g of ZSM-5 zeolite catalyst having Si/B ratio 30 was added to a stainless steel container attached with reflux device, and agitated under nitrogen atmosphere, and then heated up to 350° C. at the rate of 5° C./minute, and then reacted for 10 hours to obtain yellowish solid having high viscosity. Subsequently, the reaction product was cooled down to room temperature and then dissolved in hexane and filtered to remove solid-state material (hexane insoluble material). After this process, the filtered solution was distilled under vacuum environment to remove hexane, and distilled again under vacuum environment at 280° C. to remove small molecular oligomer, and finally 9 g of polycarbosilane was obtained. For this polycarbosilane, the same FT-IR result was obtained as shown in FIG. 1, and therefore it was confirmed pure polycarbosilane with no impurities.

The yield measured by weight ratio of input polydimethylsilane and output polycarbosilane was 45.0%.

<Third Embodiment>

20 g of the obtained polydimethylsilane and 0.3 g of zeolite Y catalyst having Si/Al ratio 2.37 was added in a stainless steel container attached with reflux device, and agitated under nitrogen atmosphere, and then heated up to 350° C. at the rate of 5° C./minute, and then reacted for 10 hours to obtain yellowish solid having high viscosity. Subsequently, the reaction product was cooled down to room temperature and then dissolved in hexane and filtered to remove solid-state material (hexane insoluble material). After this process, the filtered solution was distilled under vacuum environment to remove hexane, and distilled again under vacuum environment at 280° C. to remove small molecular oligomer, and finally 9.4 g of polycarbosilane was obtained. For this polycarbosilane, the same FT-IR result was obtained as shown in FIG. 1, and therefore it was confirmed as pure polycarbosilane with no impurities.

The yield measured by weight ratio of input polydimethylsilane and output polycarbosilane was 47.0%.

<Comparative Example 1>

20 g of the obtained polydimethylsilane was added in a stainless steel container attached with reflux device, and agitated under nitrogen atmosphere, and then heated up to 350° C. at the rate of 5° C./minute, and then reacted for 10 hours. However, no change in specimen was observed even after the reaction, and a result of FT-IR analysis revealed that it remained as polydimethylsilane, which was a starting material.

<Comparative Example 2>

0.723 g of sodium hydrate (97%) was dissolved in 80 ml of distilled water, and then it was divided into two Teflon reaction containers in halves for each. In one container it was dissolved by adding 8.258 g of sodium aluminate, and in the other container it was dissolved by adding 15.48 g of sodium meta-silicate. Subsequently, gel was formed as a result of adding the silicate solution to the aluminate solution quickly. It was stirred until gel became completely dissolved and then heated at 100° C. for 4 days to obtain zeolite A having Si/Al ratio 1.020 containing impurities. The obtained catalyst was cleaned several times with distilled water and then dried inside an oven at 100° C., and then had a reflux using aqueous solution having 0.1M of ammonium nitrate per 1 g of the catalyst to remove Na ion, which was contained in the catalyst. After this process, the catalyst was cleaned several times with distilled water and dried inside an oven, and then calcined more for 4 hours in the air at 500° C. to obtain pure zeolite A having Si/Al ratio 1.020.

20 g of the obtained polydimethylsilane and 0.3 g of the zeolite A having Si/Al ratio 1.020 were added in a stainless steel container attached with reflux device, and agitated under nitrogen atmosphere, and then heated up to 350° C. at the rate of 5° C./minute, and then reacted for 10 hours. However, no change in specimen was observed even after the reaction, and a FT-IR analysis result revealed that it remained as polydimethylsilane, a starting material.

<Comparative Example 3>

20 g of the obtained polydimethylsilane and 0.3 g of Al $Cl_3$ on the market (purity: 99%, made by Aldrich) was added in a stainless steel container attached with reflux device, and agitated under nitrogen atmosphere, and then heated up to 350° C. at the rate of 5° C./minute, and then reacted for 10 hours to obtain yellowish solid having high viscosity. Subsequently, the reaction product was cooled down to room temperature and then dissolved in hexane and filtered to remove solid-state material (hexane insoluble material). After this process, the filtered solution was distilled under vacuum environment to remove hexane, and distilled again under vacuum environment at 280° C. to remove small molecular oligomer, and finally polycarbosilane was obtained. The FT-IR was measured for this polycarbosilane, and as a result it was confirmed pure polycarbosilane with no impurities as shown in FIG. 1.

The yield measured by weight ratio of input polydimethylsilane and output polycarbosilane was 47.0%.

The present invention relates to a method of producing polycarbosilane by converting polydimethylsilane into polycarbosilane using zeolite as catalyst. When polycarbosilane is produced using a specific zeolite as catalyst, Si/Al or Si/B ratio can be adjusted at any proportion, enabling acidity control of the catalyst, and therefore the molecular weight of final products is easily controllable and the product yield can be improved, compared to conventional solid acid catalysts.

What is claimed is:

1. A process of producing polycarbosilane comprising the steps of:
   producing zeolite catalyst;
   producing polydimethylsilane;
   mixing the zeolite catalyst with the polydimethylsilane;
   reacting the mixture of the zeolite catalyst and the polydimethylsilane at a predetermined temperature for a predetermined time; and
   purifying the obtained reaction product after the reaction step to obtain polycarbosilane.

2. The process of producing polycarbosilane according to claim 1, wherein the purifying step comprises the steps of removing solid product by dissolving and filtering the reaction product in hexane, removing hexane from the reaction product in which the solid product has been removed, and removing oligomer from the reaction product in which the hexane has been removed.

3. The process of producing polycarbosilane according to claim 1, wherein the zeolite catalyst is any one of ZSM-5, ZSM-11, ZSM-12, zeolite X and zeolite Y.

4. The process of producing polycarbosilane according to claim 3, wherein 0.1~40 weight % of the zeolite catalyst is used for 100 weight % of the polydimethylsilane.

5. The process of producing polycarbosilane according to claim 3, wherein the reaction temperature is 250~450° C.

6. The process of producing polycarbosilane according to claim 3, wherein the reaction time is 3~20 hours.

7. The process of producing polycarbosilane according to claim 1, wherein the Si/Al or Si/B ratio of the zeolite catalyst is 1~200.

8. The process of producing polycarbosilane according to claim 7, wherein the zeolite catalyst is any one of ZSM-5, ZSM-11, ZSM-12, zeolite X and zeolite Y.

9. The process of producing polycarbosilane according to claim 7, wherein 0.1~10 weight % of the zeolite catalyst is used for 100 weight % of the polydimethylsilane.

10. The process of producing polycarbosilane according to claim 7, wherein the reaction temperature is 250~450° C.

11. The process of producing polycarbosilane according to claim 7, wherein the reaction time is 3~20 hours.

* * * * *